United States Patent
Ichiba et al.

(10) Patent No.: US 6,392,138 B1
(45) Date of Patent: May 21, 2002

(54) NON-PERFLUORO FLUORINE-CONTAINING RESIN MOLDED ARTICLE HAVING LOW-TEMPERATURE HEAT-SEALING PROPERTY

(75) Inventors: Shigeru Ichiba; Yutaka Nakata; Kazuhiko Shimada, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/806,828

(22) PCT Filed: Oct. 1, 1999

(86) PCT No.: PCT/JP99/05433

§ 371 Date: Apr. 5, 2001

§ 102(e) Date: Apr. 5, 2001

(87) PCT Pub. No.: WO00/20489

PCT Pub. Date: Apr. 13, 2000

(30) Foreign Application Priority Data

Oct. 6, 1998 (JP) ............................................ 10-283844

(51) Int. Cl.[7] .............................. C08J 5/00; B23B 7/10; H01L 31/048

(52) U.S. Cl. ..................... 136/251; 136/256; 428/421; 428/500; 428/515; 428/409; 427/580; 427/569; 427/385.5; 427/322; 156/272.6; 264/127

(58) Field of Search ................................. 136/251, 256; 428/421, 500, 515, 409; 427/580, 569, 385.5, 322; 156/272.6; 264/127

(56) References Cited

U.S. PATENT DOCUMENTS 5,660,646 A * 8/1997 Kataoka et al. ............. 136/251

FOREIGN PATENT DOCUMENTS

| EP | 631328 A1 | 12/1994 |
| JP | 59-73942 A | 4/1984 |
| JP | 59/73942 A * | 4/1984 |
| JP | 6-196742 A2 | 7/1994 |
| JP | 6/196742 A * | 7/1994 |
| JP | 8/198984 A * | 8/1996 |
| JP | 11/10807 A * | 1/1999 |

OTHER PUBLICATIONS

English translation of International Preliminary Examination Report for PCT/JP99/05433 dated Dec. 21, 2000.

International Search Report for PCT/JP99/05433, dated Dec. 28, 1999.

* cited by examiner

Primary Examiner—Alan Diamond
(74) Attorney, Agent, or Firm—Sughrue Mion, PLLC

(57) ABSTRACT

An excellent low temperature heat sealing property is imparted to a surface of a non-perfluoro fluorine-containing resin molded article having F/C of not more than 1.8. A non-perfluoro fluorine-containing resin molded article having a surface layer portion having a low temperature heat sealing property on at least a part of the surface layer thereof; said surface layer portion having a low temperature heat-sealing property has a ratio F/C of the number of fluorine atoms to the number of carbon atoms of $0.2 \leq F/C \leq 0.9$ and a ratio O/C of the number of oxygen atoms to the number of carbon atoms of $0.09 \leq O/C \leq 0.40$, and a remaining portion of the surface layer has a ratio F/C of the number of fluorine atoms to the number of carbon atoms which is larger than that of the surface layer portion having a low temperature heat-sealing property and is $0.8 \leq F/C \leq 1.8$.

9 Claims, 1 Drawing Sheet

NON-PERFLUORO FLUORINE-CONTAINING RESIN MOLDED ARTICLE HAVING LOW-TEMPERATURE HEAT-SEALING PROPERTY

TECHNICAL FIELD

The present invention relates to a non-perfluoro fluorine-containing resin molded article having a heat-sealing property at low temperature and a high adhesive strength, particularly to a cover film for solar batteries.

BACKGROUND ART

Since fluorine-containing resins have excellent non-sticking property, fluorine-containing resin molded articles cannot be jointed with each other or with a different material only by using an adhesive.

Also for joining the fluorine-containing resin molded articles with each other, high frequency welding and ultrasonic wave welding which are usually used in processing general-purpose resins cannot be employed because parts to be jointed cannot be melted again. Accordingly with respect to heat-meltable fluorine-containing resins, so-called melt adhesion method, in which the resin is subjected to heating at a temperature of not less than a melting point thereof and then pressing in a re-molten state, has been used. However in the melt adhesion method, since the fluorine-containing resin molded article is once melted, a mechanical strength thereof around a jointed part is lowered remarkably.

On the other hand, when the fluorine-containing resin molded article is jointed with a different kind of material, there is a chemically treating method, in which a surface of the fluorine-containing resin molded article is chemically modified with sodium-naphthalene and then joining is carried out by using an adhesive. However the method has a problem with coloring of the molded article and therefore cannot be used for applications where transparency is required.

To solve the above-mentioned problems, there are various proposals for discharge-treatment of a surface of the molded article.

For example, there are the following known methods.

(1) A method of low temperature plasma treatment by glow discharging of a molded article of perfluoro fluorine-containing resin such as polytetrafluoroethylene, tetrafluoroethylene/perfluoro(alkyl vinyl ether) copolymer or tetrafluoroethylene/hexafluoropropylene/perfluoro(alkyl vinyl ether) copolymer having a ratio of the number of fluorine atoms to the number of carbon atoms (hereinafter referred to as "F/C") of 1.8 to 2.0 to decrease F/C on the surface of molded article to 0.5 to 1.75 and then heat-sealing at a temperature of about 210° C. without using an adhesive (JP-B-5-68496), (2) A method of low temperature plasma treatment by glow discharging of a molded article of perfluoro fluorine-containing resin having a ratio F/C of the number of fluorine atoms to the number of carbon atoms of 1.9 to 2.0 in non-polymerizable gas atmosphere having an oxygen content of not more than 10% by mole to decrease F/C of the surface of molded article to 0.8 to 1.8 and to adjust a ratio of the number of oxygen atoms to the number of carbon atoms (hereinafter referred to as "O/C") to not more than $(0.2-0.09\times(F/C))$ and then heat-sealing at a temperature of about 210° C. without using an adhesive (JP-B-2-54848), (3) A method of discharge treatment of a surface of molded article of perfluoro fluorine-containing resin in a stream of an organic compound having functional group (for example, ketone and acrylic acid monomer) to impart a heat-sealing property to the surface (JP-B-37-17485, JP-B-49-12900, U.S. Pat. No. 3,296,011), (4) A method of continuous plasma treatment of a surface of a sheet in a chamber charged with helium gas or a gas mixture mainly comprising helium gas (JP-A-3-143930), or a method of imparting a hydrophilic property to plastic and fiber by glow discharging at atmospheric pressure in a stream with steam of a rare gas or gas mixture of rare gas and ketone (JP-A-6-182195), (5) A method of modifying a surface of perfluoro or non-perfluoro fluorine-containing resin molded article by discharge treatment such as corona discharging, glow discharging and plasma discharging in an inert gas atmosphere containing an organic compound having functional group (for example, acetone, glycidyl methacrylate, methanol, or the like) and then jointing by using an adhesive having functional group having affinity to a functional group of the organic compound (Japanese Patent No.2690032), and the like method.

However the above-mentioned methods (1) to (3) are directed to only perfluoro fluorine-containing resin molded articles, and treatment under reduced pressure is required.

In the method (4), since the fluorine-containing resin film is passed between the parallel plate type electrodes, the both sides of the film is treated, thus greatly lowering non-sticking property, water repellency, lubricity, stain-proofing property and chemical resistance which are features of the fluorine-containing resin. In order to make the best use of such features of the fluorine-containing resin, an opposite side of the film which is not treated must be covered with a protection film. Further in the method described in JP-A-6-182195, since an inert gas or fluorocarbon is used, the treating system must be made air-tight and collection of exhaust gas has to be considered.

The method (5) is featured by coating an adhesive having a functional group having a specific relation to the organic compound used as an atmosphere.

As mentioned above, improvements have been made mainly in heat-sealing property of perfluoro fluorine-containing resin molded articles having F/C exceeding 1.8. However a heat-sealing property of non-perfluoro fluorine-containing resins having F/C of not more than 1.8 is not enhanced as compared with perfluoro fluorine-containing resins only in case of the same treatment as in perfluoro fluorine-containing resins, and in many cases, an adhesive is necessary.

An object of the present invention is to impart excellent low temperature heat-sealing property to a surface of molded article of non-perfluoro fluorine-containing resin having F/C of not more than 1.8.

DISCLOSURE OF INVENTION

The present invention relates to a non-perfluoro fluorine-containing resin molded article, particularly a molded article in the form of film having a surface layer portion having a low temperature heat sealing property on at least a part of the surface layer thereof, in which a ratio F/C of the surface layer portion having a low temperature heat-sealing property is $0.2 \leq F/C \leq 0.9$, preferably $0.3 \leq F/C \leq 0.8$, particularly preferably $0.4 \leq F/C \leq 0.8$ and a ratio O/C thereof is $0.09 \leq O/C \leq 0.40$, preferably $0.14 \leq O/C \leq 0.30$, particularly preferably $0.14 \leq O/C \leq 0.25$, and a ratio F/C of the remaining portion of the surface layer is larger than that of the surface layer portion having a low temperature heat-sealing property and is $0.8 \leq F/C \leq 1.8$.

The molded article in the form of film is suitable as a cover film for solar batteries, in which one side of the film has a surface layer portion having a low temperature heat-sealing property and a high heat-sealing strength. The molded article can also be used as a laminated article for covering of solar batteries by heat-sealing directly to an ethylene/vinyl acetate film or sheet at a temperature less than a melting point of the non-perfluoro fluorine-containing resin.

BEST MODE FOR CARRYING OUT THE INVENTION

Figure 1:
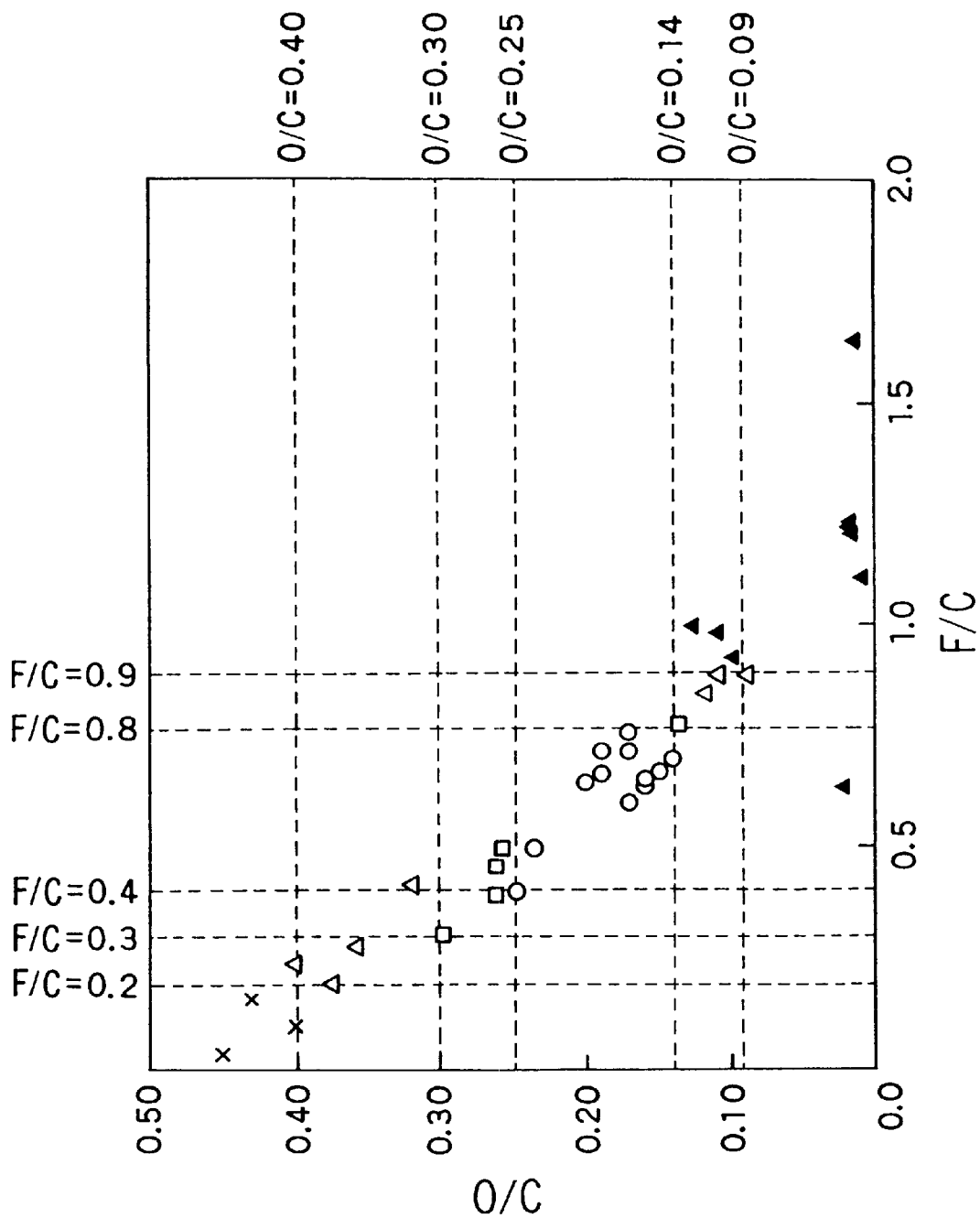
FIG. 1 is a graph showing a relation between F/C, O/C and heat-sealing strength of ETFE film subjected to discharge treatment which were measured in Example 2.

Examples of the non-perfluoro fluorine-containing resin which is used in the present invention and has F/C of 0.7 to 1.8 are, for instance, ethylene-tetrafluoroethylene copolymer (ETFE), ethylene-tetrafluoroethylene-hexafluoropropylene copolymer, polyvinylidene fluoride (PVdF), vinylidene fluoride-tetrafluoroethylene copolymer, ethylene-chlorotrifluoroethylene copolymer (ECTFE), vinylidene fluoride-chlorotrifluoroethylene copolymer, vinylidene fluoride-tetrafluoroethylene-hexafluoropropylene copolymer (THV), and the like. Particularly for the laminated film for covering of solar batteries, ETFE is preferred from the viewpoint of high transparency, mechanical strength and stress crack resistance.

It is preferable that the molded article of non-perfluoro fluorine-containing resin is in the form of film or sheet. The molded article may be in various forms such as plate, pipe, fiber, cloth (woven fabric, knitted fabric) and laminated article thereof.

With respect to the non-perfluoro fluorine-containing resin molded article having F/C of from 0.7 to 1.8, F/C thereof can be reduced to 0.2 to 0.9 and O/C can be adjusted to 0.09 to 0.40 by discharge treatment of a surface of the molded article in an atmosphere of a mixture of inert gas and reactive organic compound.

Examples of the inert gas are, for instance, nitrogen gas, helium gas, argon gas, and the like.

The reactive organic compound is a polymerizable or non-polymerizable organic compound having oxygen atom. Examples thereof are vinyl esters such as vinyl acetate and vinyl formate; acrylic acid esters such as glycidyl methacrylate; ethers such as vinyl ethyl ether, vinyl methyl ether and glycidyl methyl ether; carboxylic acids such as acetic acid and formic acid; alcohols such as methyl alcohol, ethyl alcohol, phenol and ethylene glycol; ketones such as acetone and methyl ethyl ketone; carboxylic acid esters such as ethyl acetate and ethyl formate; acrylic acids such as acrylic acid and methacrylic acid; and the like. From the point that an activity of the modified surface is difficult to be lost (life is long) and from the viewpoint of safety and easy handling, vinyl esters, acrylic acid esters and ketones are preferable, and particularly vinyl acetate and glycidyl methacrylate are preferable.

A concentration of the reactive organic compound varies depending on kinds of the organic compound and fluorine-containing resin and is usually from 0.1 to 3.0% by volume, preferably 0.1 to 1.0% by volume.

The discharge treatment can be carried out in the above-mentioned atmosphere gas by various discharging methods such as corona discharge and glow discharge, and corona discharge is preferable from the point that a pressure inside an equipment is not required to be reduced, only one side of a film is easily treated when the molded article is a film, and an influence of the atmosphere gas around the electrodes is small and thus stable discharging is easily obtained.

Discharging conditions may be optionally selected depending on desired values of F/C and O/C, kind of the non-perfluoro fluorine-containing resin and kind and concentration of the reactive organic compound. The discharge treatment is carried out usually at a charge density in a range of 0.3 to 9.0 W·sec/cm$^2$, preferably less than 3.0 W·sec/cm$^2$. A treating temperature can be optionally selected in a range of not less than 0° C. and not more than 100° C.

In the present invention, a part of the molded article is subjected to discharge treatment. Particularly in case where the molded article is in the form of film or sheet, it is preferable that only one side of the film or sheet is subjected to discharge treatment and characteristics of the fluorine-containing resin is left on another side thereof.

For discharge treatment of one side of a fluorine-containing resin film, there is a method of corona discharging by using an earth electrode in the form of roll and making the film contact with the earth electrode. However the method is not limited thereto.

The so-obtained discharge-treated molded article has a surface layer portion having a low temperature heat sealing property. The surface layer portion has a reduced F/C of $0.2 \leq F/C \leq 0.9$ and O/C of $0.09 \leq O/C \leq 0.40$. If F/C of the surface of discharge-treated molded article is less than 0.2, a sufficient heat sealing strength cannot be obtained and in case of a film, wrinkling arises due to heat generated at discharging, which remarkably lowers product quality. If more than 0.9, a sufficient heat sealing strength cannot be obtained. On the other hand, if O/C is less than 0.09, a sufficient heat sealing strength cannot be obtained, and if more than 0.40, a sufficient heat sealing strength cannot be obtained and in case of a film, wrinkling arises due to heat generated at discharging, which remarkably lowers product quality. It is preferable that the surface layer portion having a low temperature heat sealing property has F/C of $0.3 \leq F/C \leq 0.8$ and O/C of $0.14 \leq O/C \leq 0.3$ from the point that a good adhesive strength can be obtained when films are heat-sealed with each other at low temperature. It is further preferable that F/C is $0.4 \leq F/C \leq 0.8$ and O/C is $0.14 \leq O/C \leq 0.25$ from the viewpoint of excellent durability when the obtained laminated article is exposed to natural environment. It is a matter of course that F/C of the surface layer portion having a low temperature heat sealing property is smaller than F/C (0.7 to 1.8) of other (initial) surface layer portion.

In the present invention, the "surface layer portion" means a portion up to a measurable depth (about 10 nm) of the resin layer when measuring with an X-ray photoelectron spectrometer (ESCA-750 available from Shimadzu Corporation) under the conditions of X-ray-energized Al, Kα1,2 ray (1486.6 eV), X-ray output of 8 KV, 30 mA, temperature of 20° C. and vacuum degree of not more than 5.0×10$^{-7}$ Torr. F/C and O/C are calculated from $C_{1s}$, $F_{1s}$ and $O_{1s}$, measured by that method.

The non-perfluoro fluorine-containing resin molded article of the present invention can be heat-sealed strongly enough with another non-perfluoro fluorine-containing resin molded article subjected to discharge treatment in the same manner or with other materials on the surface layer portion having a low temperature heat sealing property. An enough heat sealing strength means a strength where in case of ripping off heat-sealed molded articles, the molded articles themselves are broken. The strength can be evaluated by a tensile yield strength (gf/cm) in a tension test of each fluorine-containing resin molded article (according to ASTM D 3368).

A tensile yield strength of a film varies depending on a thickness of the film. For example, in case of non-stretched ETFE film, a tensile yield strength of the film having a thickness of 6 μm which is the thinnest one available industrially is about 120 gf/cm. Therefore the film having at least such a tensile yield strength can be used practically. Further in case of 12 μm thick film which is used generally in industries, it is preferable that a tensile yield strength is not less than about 240 gf/cm.

Also in case of adhesion to other material, for example, an ethylene-vinyl acetate copolymer film which is used for a covering laminated film for solar batteries explained hereinafter, from experiential point of view, it is necessary that a surface thereof subjected to discharge treatment has a heat sealing strength of not less than 360 gf/cm. In case of adhesion to other material of the same kind, a heat sealing strength higher than a strength at break of the material of film itself is required. Also in case of a film like a covering laminated film for solar batteries which is subject to exposure to natural environment such as irradiation of ultraviolet rays, permeation of steam and thermal shock, thus deteriorating an adhered surface, a heat sealing strength thereof does not depend on a strength of the film itself, and a larger heat sealing strength is required.

Examples of other material which can be heat-sealed to the non-perfluoro fluorine-containing resin molded article of the present invention are, for instance, synthetic resin materials such as ethylene-vinyl acetate copolymer, polyimide and polyamideimide.

The heat sealing is carried out through known heat sealing method at a temperature of less than a melting point of the non-perfluoro fluorine-containing resin, for example, in a temperature range of 140° C. up to the melting point thereof. Non-restricted examples of the heat sealing method are, for instance, an impulse heat sealing method, heat press method, and the like.

The fluorine-containing resin molded article of the present invention having a low temperature heat sealing property is useful for not only a covering film for solar batteries which is explained hereinafter but also interior and exterior materials for building such as a decorative steel plate and wall paper, covering material for electric wire, and the like.

The present invention also relates to the covering film for solar batteries comprising the non-perfluoro fluorine-containing resin film subjected to the above-mentioned discharge treatment. The covering film is endowed with a low temperature heat sealing property only on one side thereof, and other side remains un-treated to utilize characteristics of the fluorine-containing resin such as non-sticking property, water repellency, lubricity, stain-proofing property, chemical resistance and electric insulation. The covering film for solar batteries of the present invention requires the above-mentioned heat sealing strength of not less than 360 gf/cm from the viewpoint of weather resistance and durability.

The covering film for solar batteries of the present invention is usually in the form of a laminated article produced by heat-sealing a treated surface thereof to other material, for example, an ethylene-vinyl acetate copolymer (EVA) film or sheet. The solar battery is protected by that laminated article.

A thickness of the covering film for solar batteries is usually from about 50 μm to about 0.1 mm, and a thickness of EVA film or sheet is usually from about 0.1 mm to about 1.0 mm.

EXAMPLE

The present invention is then explained by means of examples, but is not limited to them.

Example 1

One side of a 100 μm thick ETFE film (F/C=1.1, NEOFLON ETFE film EF-0100 available from DAIKIN INDUSTRIES, LTD.) was subjected to corona discharge treatment at a charge density shown in Table 1 by continuously passing the film along an earth electrode (60° C.) in the form of roll while flowing nitrogen gas containing 0.3 % by volume of vinyl acetate or glycidyl methacrylate in the neighborhood of a discharge electrode and the earth electrode of a corona discharge equipment.

With respect to a surface layer portion subjected to corona discharge treatment (having low temperature heat sealing property), F/C and O/C were calculated with the above-mentioned ESCA. The results are shown in Table 1.

Then two treated ETFE films were subjected to heat pressing at 170° C. for five minutes while the surface layer portions having low temperature heat sealing property were faced with each other. Thus a sample for measuring a heat sealing strength was produced. The sample was subjected to 180° C. peeling test (drawing speed: 100 mm/min) in according to JIS K 6845 by using a universal tensile tester (ASG-50D available from Shimadzu Corporation). Measured values are shown in Table 1 as a heat sealing strength.

TABLE 1

| Charge density (W sec/cm$^2$) | Reactive organic compound | Surface layer portion having low temperature heat sealing property | | Heat sealing strength (gf/cm) |
| --- | --- | --- | --- | --- |
| | | F/C | O/C | |
| 8.3 | Vinyl acetate | 0.1 | 0.42 | 132 |
| 0.8 | Vinyl acetate | 0.8 | 0.17 | 539 |
| 0.4 | Vinyl acetate | 0.9 | 0.09 | 120 |
| 0.3 | Vinyl acetate | 1.0 | 0.10 | 24 |
| 0.8 | Glycidyl methacrylate | 0.7 | 0.14 | 420 |
| 0.8 | — | 1.0 | 0.12 | 0 |

Example 2

ETFE films having a surface layer portion which has a low temperature heat sealing property and various F/C and O/C values were produced in the same manner as in Example 1 by optionally changing a concentration of vinyl acetate and a charge density of corona discharging. A heat sealing strength thereof was measured in the same manner as in Example 1.

The results are shown in FIG. 1. In FIG. 1, ○ represents the film having a heat sealing strength of not less than 360 gf/cm, □ represents the film having a heat sealing strength of not less than 240 gf/cm and less than 360 gf/cm, ▼ represents the film having a heat sealing strength of not less than 120 gf/cm and less than 240 gf/cm, ▼ represents the film having a heat sealing strength of less than 120 gf/cm and x represents the deformed film.

As shown in FIG. 1, if F/C exceeds 0.9, a heat sealing strength becomes less than 120 gf/cm and the film is easily peeled, and if F/C is less than 0.2, the film is deformed. Also if O/C exceeds 0.4, deformation of the film arises, and if O/C is less than 0.09, a heat sealing strength lowers below 120 gf/cm. On the other hand, particularly in case where F/C and O/C are 0.3≦F/C≦0.8 and 0.14≦O/C≦0.3, respectively, an excellent heat sealing strength can be obtained. Further in case where F/C and O/C are 0.4≦F/C≦0.8 and 0.14≦O/C≦0.25, respectively, a high heat sealing strength required by a covering film for solar batteries can be obtained.

Example 3

ETFE films having a surface layer portion which have a low temperature heat sealing property and F/C and O/C values shown in Table 2 were produced in the same manner as in Example 1 except that a 50 μm thick ETFE film (F/C=1.1, NEOFLON ETFE film EF-0050 available from DAIKIN INDUSTRIES, LTD.) was used. Those ETFE films were heat-sealed with each other in the same manner as in Example 1. A heat sealing strength thereof was as shown in Table 2.

On the surface of ETFE film having a low temperature heat sealing property were overlaid a EVA film (BOND FAST G available from SUMITOMO CHEMICAL INDUSTRY CO., LTD., 0.05 mm thick) and then an aluminum sheet (0.2 mm thick) subjected to greasing with acetone, followed by pressing at 60 gf/cm$^2$ and heating at 150° C. for two hours in an electric oven. Thus a laminated article was produced in imitation of a solar battery panel. The obtained laminated article was allowed to stand in environment of a temperature of 85° C.±2° C. and a relative humidity of 90 to 93±5% RH for 1,000 hours and taken out of the environment. Whether or not there was a separation of the ETFE film and EVA film was checked with naked eyes. The results are shown in Table 2.

TABLE 2

| Surface layer portion having low temperature heat sealing property | | Heat sealing strength | Durability at high temperature and high humidity (85° C. ± 2° C., 90 to 93 ± 5 RH, |
| --- | --- | --- | --- |
| F/C | O/C | (gf/cm) | 1,000 hours) |
| 0.4 | 0.26 | 210 | Peeling of ETFE film occurred. |
| 0.5 | 0.26 | 340 | Peeling of ETFE film occurred. |
| 0.4 | 0.25 | 360 | No change |
| 0.7 | 0.14 | 870 | No change |

As shown in Table 2, in order to meet high weather resistance and durability requirements as a cover film for solar batteries, a heat sealing strength of not less than 360 gf/cm is necessary.

INDUSTRIAL APPLICABILITY

According to the present invention, an excellent low temperature heat sealing property can be imparted to a non-perfluoro fluorine-containing resin which is difficult to heat-seal at low temperature, and also a fluorine-containing resin film which can be used as a covering film for solar batteries which is required to have high weather resistance and durability can be provided.

What is claimed is:

1. A non-perfluoro fluorine-containing resin molded article having a surface layer; a part of the surface layer comprises a surface layer portion having a low temperature heat sealing property; said surface layer portion having a low temperature heat-sealing property has a ratio F/C of the number of fluorine atoms to the number of carbon atoms of 0.2≦F/C≦0.9 and a ratio O/C of the number of oxygen atoms to the number of carbon atoms of 0.09≦O/C≦0.40, and a remaining part of the surface layer has a ratio F/C of the number of fluorine atoms to the number of carbon atoms which is larger than that of the surface layer portion having a low temperature heat-sealing property and is 0.8≦F/C≦1.8.

2. The fluorine-containing resin molded article of claim 1, wherein the ratio F/C of the number of fluorine atoms to the number of carbon atoms of said surface layer portion having a low temperature heat sealing property is 0.3≦F/C≦0.8 and the ratio O/C of the number of oxygen atoms to the number of carbon atoms is 0.14≦O/C≦0.30.

3. The fluorine-containing resin molded article of claim 1, wherein the ratio F/C of the number of fluorine atoms to the number of carbon atoms of said surface layer portion having a low temperature heat-sealing property is 0.4≦F/C≦0.8 and die ratio O/C of the number of oxygen atoms to the number of carbon atoms is 0.14≦O/C≦0.25.

4. The fluorine-containing resin molded article of claim 1, wherein a low temperature heat sealing property is exhibited at a temperature of not more than a melting point of the non-perfluoro fluorine-containing resin molded article.

5. The fluorine-containing resin molded article of claim 4, wherein said non-perfluoro fluorine-containing resin is an ethylene/tetrafluoroethylene copolymer or polyvinylidene fluoride.

6. The fluorine-containing resin molded article of claim 1, wherein said non-perfluoro fluorine-containing resin molded article is a film.

7. A covering film for solar batteries which comprises the film of claim 6 wherein a first side of said film has a surface layer portion having a low temperature heat sealing property and the surface layer of the opposite side of said film has a ratio F/C which is larger than that of the surface layer portion of said first side.

8. The covering film for solar batteries of claim 7, wherein the surface layer portion having a low temperature heat sealing property has a heat sealing strength of not less than 360 gf/cm.

9. A covering laminated article for solar batteries, which is produced by heat-sealing the covering film of claim 7 directly with an ethylene/vinyl acetate film or sheet at a temperature of less than a melting point of the non-perfluoro fluorine-containing resin.

* * * * *